United States Patent
Jain et al.

(10) Patent No.: US 11,979,891 B2
(45) Date of Patent: May 7, 2024

(54) USER EQUIPMENT (UE) CAPABILITY FREQUENCY BAND COMBINATION PRIORITIZATION

(71) Applicant: QUALCOMM Incorporated, San Diego, CA (US)

(72) Inventors: Hitesh Jain, Udaipur (IN); Sarath Kumar Pujari, Hyderabad (IN); Ansah Ahmed Sheik, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 17/232,035

(22) Filed: Apr. 15, 2021

(65) Prior Publication Data
US 2022/0338188 A1    Oct. 20, 2022

(51) Int. Cl.
*H04W 72/51* (2023.01)
*H04W 72/0453* (2023.01)
*H04W 72/56* (2023.01)

(52) U.S. Cl.
CPC ....... *H04W 72/51* (2023.01); *H04W 72/0453* (2013.01); *H04W 72/56* (2023.01)

(58) Field of Classification Search
CPC . H04W 72/51; H04W 72/0453; H04W 72/56; H04W 8/24; H04L 5/0092; H04L 5/001; H04L 5/005; H04L 5/0051; H04L 2012/6486; H04B 1/0053
See application file for complete search history.

(56) References Cited

U.S. PATENT DOCUMENTS

| | | | | |
|---|---|---|---|---|
| 10,979,953 B2* | 4/2021 | Kim | ............... | H04W 28/0263 |
| 11,057,962 B2* | 7/2021 | Iskander | ............... | H04W 76/27 |
| 2017/0367073 A1* | 12/2017 | Murugan | ............... | H04L 5/001 |
| 2018/0198502 A1* | 7/2018 | Kim | ............... | H04B 7/046 |
| 2019/0253925 A1* | 8/2019 | Gholmieh | ............... | H04B 1/005 |
| 2020/0092879 A1* | 3/2020 | Wu | ............... | H04W 76/15 |
| 2020/0351645 A1* | 11/2020 | Jin | ............... | H04W 76/11 |
| 2022/0394461 A1* | 12/2022 | Lu | ............... | H04W 72/20 |

* cited by examiner

*Primary Examiner* — Mohammed S Chowdhury
(74) *Attorney, Agent, or Firm* — Holland & Hart LLP

(57) ABSTRACT

Methods, systems, and devices for wireless communications manager are described. An example method for wireless communication at a UE includes receiving a request for a frequency band capability of the UE from a network, wherein the request includes a plurality of network frequency bands. The method may also include selecting a subset of frequency band combinations from a plurality of frequency band combinations supported by the UE, wherein a numerical quantity of the plurality of frequency band combinations supported by the UE exceeds a size constraint of a capability message, and wherein the subset includes at least one frequency band combination for each network frequency band. The method may also include sending the capability message in response to the request that includes an indication of the subset of frequency band combinations.

24 Claims, 9 Drawing Sheets

USER EQUIPMENT (UE) CAPABILITY FREQUENCY BAND COMBINATION PRIORITIZATION

FIELD OF TECHNOLOGY

The following relates to wireless communications manager, including UE capability frequency band combination prioritization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as a UE.

A network may send a message to a UE that requests the UE to inform the network of its frequency band capabilities. The request may be a UE Capability Enquiry message and may identify frequency bands that the network supports. In response, the UE may transmit a UE Capability Information message over the air that has a limited maximum size in response to the request, which indicates some of the frequency band combinations that the UE supports.

SUMMARY

The described techniques relate to improved methods, systems, devices, and apparatuses that support UE capability frequency band combination prioritization. Generally, the described techniques provide for prioritization of frequency band combinations for a UE to include in a UE Capability Information message, in response to a UE capability request, when not all of the supported frequency band combinations can fit within size restrictions for the UE Capability Information message. The UE may include at least one frequency band combination for each of the requested network frequency bands that has uplink support at the UE. The UE may use prioritization techniques for determining which subset of frequency band combinations to include in the UE Capability Information message. If there is not enough space in the UE Capability Information message for a supported frequency band combination having uplink support for each of the network frequency bands, the UE may include the frequency band combinations in an order identified in the UE capability request. If there is additional room leftover in the UE Capability Information message after at least one frequency band combination for each network frequency band has been included, the UE may add additional frequency band combinations according to techniques described herein.

An apparatus for wireless communication at a UE is described. The apparatus may include a processor, memory coupled with the processor, and instructions stored in the memory. The instructions may be executable by the processor to cause the apparatus to receive a request for a frequency band capability of the UE from a network, where the request includes a set of multiple network frequency bands, select a subset of frequency band combinations from a set of multiple frequency band combinations supported by the UE, where a numerical quantity of the set of multiple frequency band combinations supported by the UE exceeds a size constraint of a capability message, and where the subset of frequency band combinations includes at least one frequency band combination for each network frequency band of the set of multiple network frequency bands, and send the capability message in response to the request, the capability message including an indication of the subset of frequency band combinations.

A method for wireless communication at a UE is described. The method may include receiving a request for a frequency band capability of the UE from a network, where the request includes a set of multiple network frequency bands, selecting a subset of frequency band combinations from a set of multiple frequency band combinations supported by the UE, where a numerical quantity of the set of multiple frequency band combinations supported by the UE exceeds a size constraint of a capability message, and where the subset of frequency band combinations includes at least one frequency band combination for each network frequency band of the set of multiple network frequency bands, sending the capability message in response to the request, and the capability message including an indication of the subset of frequency band combinations.

Another apparatus for wireless communication at a UE is described. The apparatus may include means for receiving a request for a frequency band capability of the UE from a network, where the request includes a set of multiple network frequency bands, means for selecting a subset of frequency band combinations from a set of multiple frequency band combinations supported by the UE, where a numerical quantity of the set of multiple frequency band combinations supported by the UE exceeds a size constraint of a capability message, and where the subset of frequency band combinations includes at least one frequency band combination for each network frequency band of the set of multiple network frequency bands, and means for sending the capability message in response to the request, the capability message including an indication of the subset of frequency band combinations.

A non-transitory computer-readable medium storing code for wireless communication at a UE is described. The code may include instructions executable by a processor to receive a request for a frequency band capability of the UE from a network, where the request includes a set of multiple network frequency bands, select a subset of frequency band combinations from a set of multiple frequency band combinations supported by the UE, where a numerical quantity of the set of multiple frequency band combinations supported by the UE exceeds a size constraint of a capability message, and where the subset of frequency band combinations includes at least one frequency band combination for each network frequency band of the set of multiple network frequency bands, and send the capability message in response to the request, the capability message including an indication of the subset of frequency band combinations.

In some examples of the method, apparatuses, and non-transitory computer-readable medium described herein, the numerical quantity of the set of multiple frequency band combinations supported by the UE exceeds the size constraint of the capability message when indications of only some of the set of multiple frequency band combinations can fit within the capability message.

Some examples of the method, apparatuses, and non-transitory computer-readable medium described herein may further include operations, features, means, or instructions for selecting additional frequency band combinations for inclusion in the capability message from the set of multiple frequency band combinations after including the subset of frequency band combinations to fill a maximum size of the capability message.

Some examples of the method, apparatuses, and non-transitory computer-readable medium described herein may further include operations, features, means, or instructions for selecting the subset of frequency band combinations from the set of multiple frequency band combinations supported by the UE may be based on an order of the set of multiple network frequency bands in the request.

Some examples of the method, apparatuses, and non-transitory computer-readable medium described herein may further include operations, features, means, or instructions for selecting the subset of frequency band combinations from the set of multiple frequency band combinations supported by the UE may be based on a number of component carriers of the frequency band combination.

In some examples of the method, apparatuses, and non-transitory computer-readable medium described herein, each frequency band of the subset of frequency bands supports uplink capabilities at the UE.

In some examples of the method, apparatuses, and non-transitory computer-readable medium described herein, the capability message includes a single reporting element with a maximum size that may be smaller than a size for reporting all of the set of multiple frequency band combinations supported by the UE.

In some examples of the method, apparatuses, and non-transitory computer-readable medium described herein, the at least one frequency band combination includes at least one evolved universal terrestrial radio access (EUTRA)-new radio (NR) dual connectivity (ENDC) frequency band combination and at least one standalone frequency band combination.

In some examples of the method, apparatuses, and non-transitory computer-readable medium described herein, the set of multiple network frequency bands include frequency bands from at least two different radio access technologies.

Some examples of the method, apparatuses, and non-transitory computer-readable medium described herein include communicating with the network over a frequency band combination indicated in the capability message.

DETAILED DESCRIPTION

Figure 1:
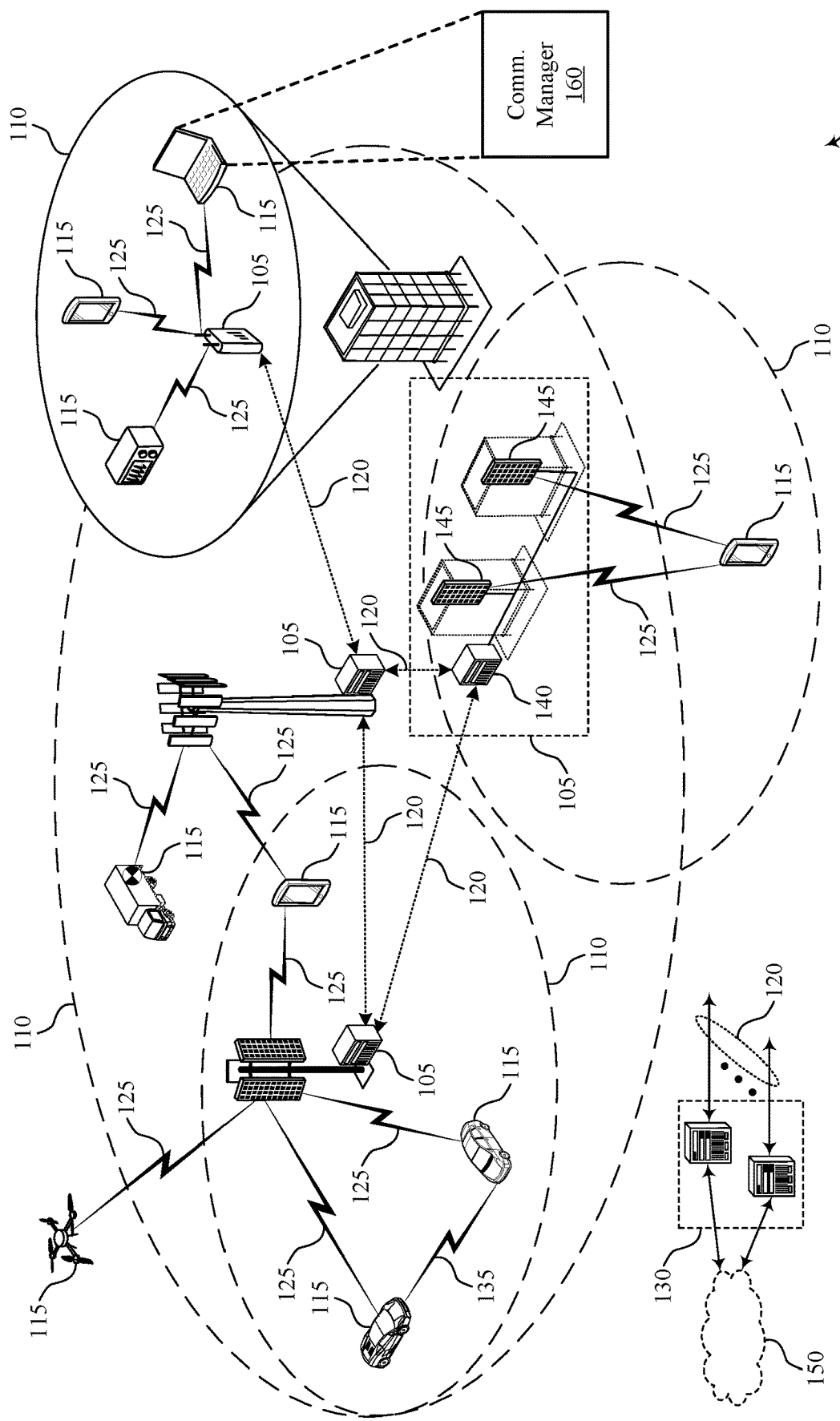
FIG. 1 illustrates an example of a wireless communications system that supports UE capability frequency band combination prioritization in accordance with aspects of the present disclosure.

A network may send a request for a frequency band capability to a UE. The network may use the frequency band capabilities of the UE to determine which frequency bands to communicate with the UE, including for direct connections, handovers, and radio link failure connection and release. The network request may be a UE Capability Enquiry message, and it may include an indication of the frequency bands supported by the network or by one or more base stations. These frequency bands may be referred to herein as network frequency bands. The network frequency bands may include one or more New Radio (NR) network frequency bands or evolved universal mobile telecommunication system terrestrial radio access (E-UTRA) frequency bands.

A UE that receives the UE Capability Enquiry message may respond with a capability message, such as a UE Capability Information message, that identifies at least some frequency band combinations that the UE supports. The frequency band combinations may relate to the network frequency bands. For example, the UE would include frequency band combinations for frequencies supported by the network in the capability message. However, the UE may have more supported frequency band combinations for the network frequency bands than may be indicated within a single UE Capability Information message. The UE Capability Information message may be limited in size. For example, a maximum Packet Data Convergence Protocol (PDCP) protocol data unit (PDU) size for the UE Capability Information message may be 8 kilobytes (kb) for standalone networks (SA) or 9 kb for non-standalone networks (NSA). The UE may not be able to indicate all of its supported frequency band combinations within a single UE Capability Information message. However, if the UE removes some of the supported frequency band combinations for the requested network frequency band, the UE may not be able to do redirections and handover on the cell of that network frequency band.

The UE may use techniques described herein to prioritize which frequency band combinations to include in the UE Capability Information message when not all of the relevant and supported frequency band combinations can fit within the limited size of a single UE Capability Information message. According to techniques described herein, the UE may include indications for at least one band combination for each of the requested network frequency bands. At least one frequency band combination that is included for each network frequency band has uplink support (some frequency band combinations supported by the UE may only include downlink support).

Once at least one frequency band combination that has uplink support for each of the requested network frequency bands is indicated in the UE Capability Information message, the UE may start to fill in other supported frequency band combinations until the UE Capability Information message is full. The UE may fill in the other frequency band combinations based on a default order of the UE itself, based on an order of appearance of the network frequency bands in the request, or based on another prioritization. In the event that the UE Capability Information message cannot fit indications for at least one frequency band combination having uplink support for each requested network frequency band, the UE may also prioritize which frequency band combinations to include based on a prioritization, such as following the requested network frequency band order in the UE Capability Enquiry message.

Aspects of the disclosure are initially described in the context of wireless communications systems. Aspects of the disclosure are further illustrated by and described with reference to a process flow and a flowchart. Aspects of the disclosure are further illustrated by and described with reference to apparatus diagrams, system diagrams, and flowcharts that relate to UE capability frequency band combination prioritization.

FIG. 1 illustrates an example of a wireless communications system 100 that supports UE capability frequency band combination prioritization in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an E-UTRA absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may include a communications manager 160. The communications manager 160 may include a capability message manager and a frequency band manager. The communications manager 160 may use techniques described herein to provide prioritization for inclusion of frequency band combinations in a UE capability message. The communications manager 160 may receive a request for a frequency band capability of the UE from a network, wherein the request includes a plurality of network frequency bands. The communications manager 160 may select a subset of frequency band combinations from a plurality of frequency band combinations supported by the UE, wherein a numerical quantity of the plurality of frequency band combinations supported by the UE exceeds a size constraint of a capability message, and wherein the subset of frequency band combinations includes at least one frequency band combination for each network frequency band of the plurality of network frequency bands. The communications manager 160 may send the capability message in response to the request, the capability message comprising an indication of the subset of frequency band combinations. The communications manager 160 may communicate with the network over a frequency band combination indicated in the capability message.

The communications manager 160 may improve UE wireless coverage, reduce call dropping, improve handovers, and reduce radio link failure (RLF) and its associated connection-release. The communications manager 160 may also improve battery life at the UE, reduce power savings at the UE, improve throughput, improve reliability of communications, and reduce interference with other devices.

Figure 2:
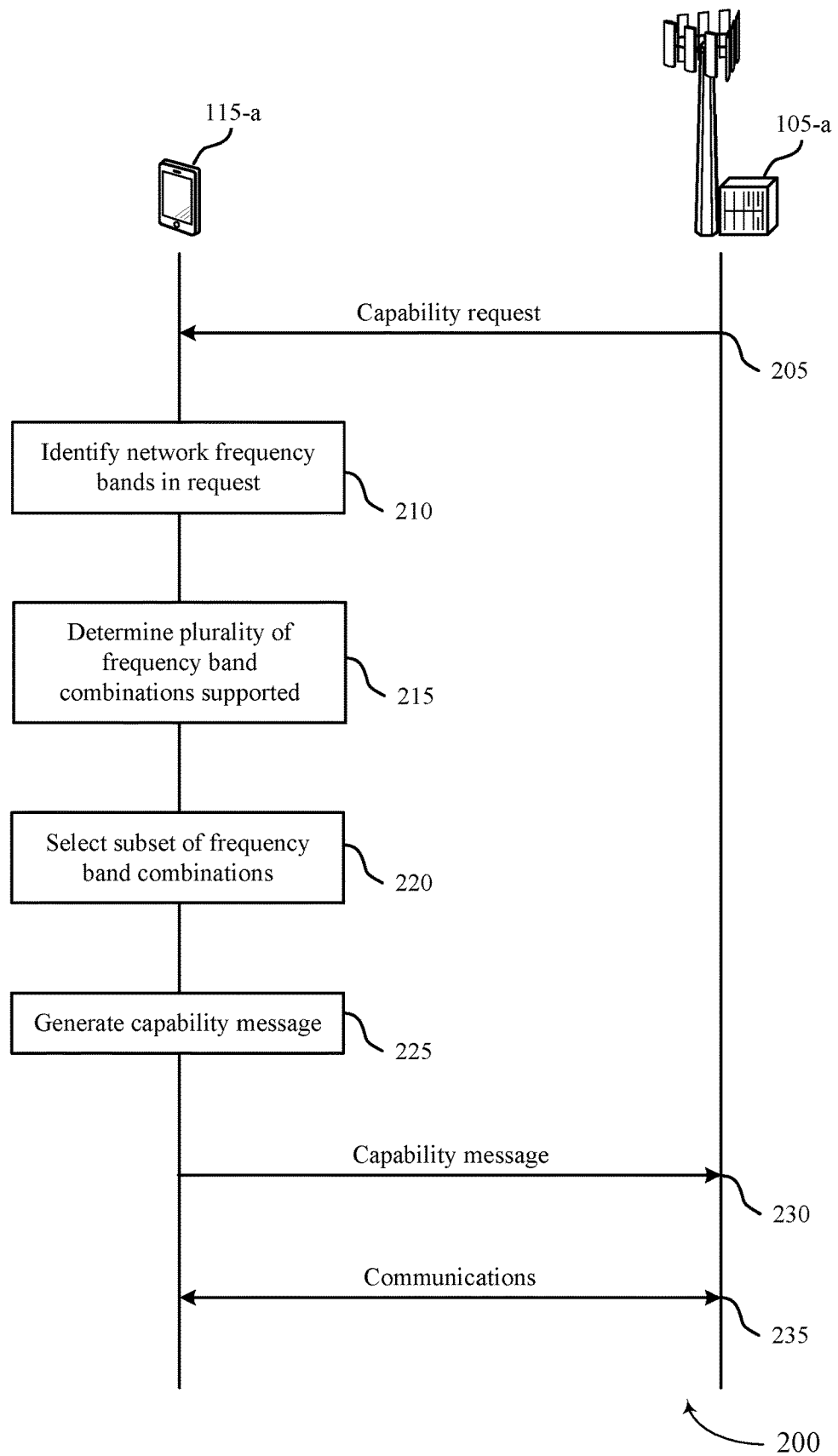
FIG. 2 illustrates an example of a process flow that supports UE capability frequency band combination prioritization in accordance with aspects of the present disclosure.

FIG. 2 illustrates an example of a process flow 200 that supports UE capability frequency band combination prioritization in accordance with aspects of the present disclosure. The process flow 200 supports techniques for prioritizing which supported frequency band combinations to include in response to a capability enquiry request message. In some examples, the process flow 200 may implement aspects of wireless communications system 100. For example, the process flow 200 may illustrate receiving a capability request, selecting a subset of frequency band combinations supported by the UE, sending a capability message that includes indications for the selected subset, and communicating with the network over an indicated frequency band combination, as described with reference to FIG. 1. The process flow 200 may include a base station 105-a that may be an example of aspects of a base station 105 as described herein. The process flow 200 may also include a UE 115-a that may be an example of aspects of a UE 115 as described herein.

At 205, the base station 105-a may send a capability request to the UE 115-a. The capability request may identify frequency bands supported by the base station 105-a or other base stations 105 in the network. The capability request may ask the UE 115-a to inform the base station 105-a of the frequency band combinations supported by the UE 115-a that are related to the network frequency bands in the capability request. The network request may be a UE Capability Enquiry message and it may identify several NR and E-UTRA frequency bands. In other examples, other types of frequency bands may be included in the capability request.

For example, the capability request may identify network frequency bands that may include E-UTRA(1,2,3,41,66) and NR bands (including mmW bands and sub-6 Gz bands), such as NR(257,261,1,2,3,7,77,78,79,41,66). In other examples, other network frequency bands may be indicated in the capability request.

The UE 115-a may receive the capability request. At 210, the UE 115-a may identify or otherwise determine the network frequency bands included in the capability request. For example, the network may support many NR and E-UTRA frequency bands, as in the above example, while the UE 115-a may only support a subset of those NR and E-UTRA frequency bands. In some examples, the UE 115-a may support more or different frequency bands than those indicated by the capability message. The UE 115-a may only include those frequency band combinations that are relevant to the network, as indicated by the network frequency bands included within the capability request.

Some example NR carrier aggregation frequency band combinations include (n257AA+n261A), (n257A+n261AA), (n257AA+n1A+n3A), (n257A+n1AA+n3A), (n257AA+n1A+n3A), (n261AA+n1A+n3A), and the like. Example ENDC combinations may include (b1AA+b3A+b66A+n257AA+n257A), (b1A+b3AA+b66A+n257AA+n257A), and the like. The notation for the frequency band combination includes a prefix, a band number, and a suffix. The prefix indicates the type of wireless communications technology (e.g., a radio access technology). In this example, n indicates NR and b indicates E-UTRA. The band number is the frequency band number, e.g., 261, 257, 66, and the like. The next character indicates the downlink bandwidth class and the second character indicates the uplink bandwidth class. The first letter of the suffix indicates the downlink class and, if present, the second letter of the suffix indicates the uplink class. For example, A may indicate a single component character permit class. B may indicate a two component carrier permit class. The downlink and uplink bandwidth classes may be determined using specification tables, for example, Tables 1 and 2 shown below.

Table 1 shows an example of carrier aggregation bandwidth classes and corresponding nominal guard bands.

TABLE 1

| CA Bandwidth Class | Aggregated Transmission Bandwidth Configuration | Number of contiguous CC | Nominal Guard Band ($BW_{GB}$) |
| --- | --- | --- | --- |
| A | $N_{RB,agg} \leq 100$ | 1 | $a_1 \, BW_{Channel(1)} - 0.5 \, \Delta f_1$ (NOTE 2) |
| B | $25 < N_{RB,agg} \leq 100$ | 2 | $0.05 \max (BW_{Channel(1)}, BW_{Channel(2)}) - 0.5 \, \Delta f_1$ |
| C | $100 < N_{RB,agg} \leq 200$ | 2 | $0.05 \max (BW_{Channel(1)}, BW_{Channel(2)}) - 0.5 \, \Delta f_1$ |
| D | $200 < N_{RB,agg} \leq 300$ | 3 | $0.05 \max (BW_{Channel(1)}, BW_{Channel(2)}, BW_{Channel(3)}) - 0.5 \, \Delta f_1$ |
| E | $300 < N_{RB,agg} \leq 400$ | 4 | $0.05 \max (BW_{Channel(1)}, BW_{Channel(2)}, BW_{Channel(3)}, BW_{Channel(4)}) - 0.5 \, \Delta f_1$ |
| F | $400 < N_{RB,agg} \leq 500$ | 5 | $0.05 \max (BW_{Channel(1)}, BW_{Channel(2)}, BW_{Channel(3)}, BW_{Channel(4)}, BW_{Channel(5)}) - 0.5 \, \Delta f_1$ |
| I | $700 < N_{RB,agg} \leq 800$ | 8 | NOTE 3 |

NOTE 1:

$BW_{Channel(j)}$, j = 1, 2, 3, 4 is the channel bandwidth of an E-UTRA component carrier according to Table 5.6-1 and $\Delta f_1 = \Delta f$ for the downlink with $\Delta f$ the subcarrier spacing while $\Delta f_1 = 0$ for the uplink.

NOTE 2:

$a_1 = 0.16/1.4$ for $BW_{Channel(1)} = 1.4$ MHz whereas $a_1 = 0.05$ for all other channel bandwidths.

Table 2 shows another example of carrier aggregation bandwidth classes, aggregated channel bandwidths, and number of contiguous component carriers (CCs).

TABLE 2

| NR CA Bandwidth Class | Aggregated channel bandwidth | Number of contiguous CC | Fallback group |
|---|---|---|---|
| A | $BW_{Channel} \leq 400$ MHz | 1 | 1, 2, 3, 4 |
| B | $400$ MHz $\leq BW_{Channel\_CA} \leq 800$ MHz | 2 | 1 |
| C | $800$ MHz $\leq BW_{Channel\_CA} \leq 1200$ MHz | 3 | |
| D | $200$ MHz $\leq BW_{Channel\_CA} \leq 400$ MHz | 2 | 2 |
| E | $400$ MHz $\leq BW_{Channel\_CA} \leq 600$ MHz | 3 | |
| F | $600$ MHz $\leq BW_{Channel\_CA} \leq 800$ MHz | 4 | |
| G | $100$ MHz $\leq BW_{Channel\_CA} \leq 200$ MHz | 2 | 3 |
| H | $200$ MHz $\leq BW_{Channel\_CA} \leq 300$ MHz | 3 | |
| I | $300$ MHz $\leq BW_{Channel\_CA} \leq 400$ MHz | 4 | |
| J | $400$ MHz $\leq BW_{Channel\_CA} \leq 500$ MHz | 5 | |
| K | $500$ MHz $\leq BW_{Channel\_CA} \leq 600$ MHz | 6 | |
| L | $600$ MHz $\leq BW_{Channel\_CA} \leq 700$ MHz | 7 | |
| M | $700$ MHz $\leq BW_{Channel\_CA} \leq 800$ MHz | 8 | |
| O | $100$ MHz $\leq BW_{Channel\_CA} \leq 200$ MHz | 2 | 4 |
| P | $150$ MHz $\leq BW_{Channel\_CA} \leq 300$ MHz | 3 | |
| Q | $200$ MHz $\leq BW_{Channel\_CA} \leq 400$ MHz | 4 | |

NOTE 1:
Maximum supported component carrier bandwidths for fallback groups 1, 2, 3 and 4 are 400 MHz, 200 MHz, 100 MHz and 100 MHz respectively except for CA bandwidth class A.
NOTE 2:
It is mandatory for a UE to be able to fallback to lower order CA bandwidth class configuration within a fallback group. It is not mandatory for a UE to be able to fallback to lower order CA bandwidth class configuration that belong to a different fallback group.

As an example, b1AA indicates an E-UTRA (e.g., LTE) band 1, which supports a single carrier on downlink and a single carrier on an uplink. LTE b3A supports only downlink and does not support any uplink. LTE b66A supports only downlink. As another example, n257AA indicates NR band 257, which supports downlink and uplink with a single carrier. N257A supports downlink and does not support uplink.

The frequency band combination (b1AA+b3A+b66A+n257AA+n257A) is considered as another example. In this example, there are five carriers possible that the UE 115-a supports. Here b means LTE, which is serving on frequency bands 1, 3, and 66 simultaneously. The UE 115-a is also serving NR frequency band 257, one for downlink (e.g., n257A) and one for uplink (e.g., n257AA). For this frequency band combination, there are a total of five carriers, 3 on LTE and 2 on NR. Some carriers that only support uplink and others only downlink.

At 215 of FIG. 2, the UE 115-a may determine which frequency band combinations it supports that are within the network frequency bands that the network supports. For example, if the capability request identifies E-UTRA(1,2,3,41,66) and NR(257,261,1,2,3,7,77,78,79,41,66) as network frequency bands, the UE 115-a may support many frequency band combinations for these network frequency bands. For example, the UE 115-a may support many frequency band combinations for just the 257 and 261 network frequency bands. For example, the UE 115-a may support NR carrier aggregation (NRCA) frequency band combinations including (n257AA+n261A), (n257A+n261AA), (n257AA+n1A+n3A), (n257A+n1AA+n3A), (n257AA+n1A+n3A), and (n261AA+n1A+n3A), and the like. The UE 115-a may support ENDC frequency band combinations (b1AA+b3A+b66A+n257AA+n257A), (b1A+b3AA+b66A+n257AA+n257A), etc.

If the UE 115-a tried to include all of these frequency band combinations, they would not all fit within the reserved space in the capability message. For example, just the mmW frequency band combinations may take the whole space of the single capability message. If the UE 115-a only advertised the mmW frequency band combinations, the UE 115-a may never be able to advertise any of the frequency band combinations associated with the later frequency bands requested by the network. For example, the UE 115-a would never be able to advertise any frequency band combination associated with n66. This may result in the UE 115-a not being able to achieve handover to any n66 based PCell. That is, in the case of SA, if the UE 115-a is operating on n1 and wants to handover to n66, the UE 115-a will not be able to do the handover to n66 because this capability has not ben advertised to the network (e.g., the capability message did not include a frequency band with the n66 combination). Similarly, in the case of NSA, if the UE 115-a is operating on the b1+n257 frequency band combination and needs to move to SA n66, the UE 115-a will not be able to achieve this because the UE 115-a has not advertised support for any band combinations with n66 to the network.

In order to reduce the likelihood of not advertising support for a frequency band that the network supports, the techniques described herein enable the UE 115-a to advertise frequency band combinations where at least one frequency band combination that has uplink capability is included for each network frequency. This way, the network will be able to handover the UE 115-a to any supported cell.

At 220, the UE 115-a may select a subset of frequency band combinations from the plurality of frequency band combinations that the UE supports and are associated with the network frequency bands. The UE 115-a may select a subset of the frequency band combinations because not all of the supported frequency band combinations may be indicated in the capability message. The UE 115-a may select the subset to include at least one frequency band combination that supports uplink at the UE to be included for each network frequency band.

The UE may use techniques described herein to prioritize which frequency band combinations to include in the UE Capability Information message when not all of the relevant and supported frequency band combinations can fit within the limited size of a single UE Capability Information message. If the UE 115-a were to report all the frequency band combinations supported related to the network frequency bands in no particular order, the UE 115-a may not be able to include frequency band combinations having uplink support for each network frequency band due to the maximum over-the-air size limit for the UE Capability Information message (e.g., 8 kb or 9 kb). In such a scenario, the base station 105-a may not be able to communicate with the UE 115-a on frequency bands not included in the capability message. Therefore, coverage would be restricted at the UE 115-a. That is, if the UE 115-a does not include supported frequency band combinations for some of the network frequency bands, then the UE 115-a will not be able to do redirections and handover on that band's cell.

According to techniques described herein, the UE 115-a may trim down the frequency band combinations that are included within the capability message such that the maximum PDCP PDU size of the capability message is not exceeded. The UE 115-a may include indications for at least one band combination for each of the requested network frequency bands. For example, at least one frequency band combination that is included for each network frequency band has uplink support at the UE 115-a. In some examples, the numerical quantity of the set of multiple frequency band combinations supported by the UE 115-a exceeds the size constraint of the capability message when indications of only some of the set of multiple frequency band combinations can fit within the capability message. The numerical quantity of the set of multiple frequency band combinations may refer to the number of frequency band combinations that may be indicated within the capability message.

Once at least one frequency band combination that has uplink support for each of the requested network frequency bands is indicated in the UE Capability Information message, the UE 115-a may fill in other supported frequency band combinations until the UE Capability Information message is full. The UE 115-a may fill in the other frequency band combinations based on a default order of the UE 115-a itself, based on an order of appearance of the network frequency bands in the request, or based on another prioritization. In the event that the UE Capability Information message cannot fit indications for at least one frequency band combination having uplink support for each requested network frequency band, the UE 115-a may also prioritize which frequency band combinations to include based on a prioritization, such as following the requested network frequency band order in the UE Capability Enquiry message.

In some examples, the UE 115-a may first prioritize at least one frequency band combination with all network requested frequency bands. In some examples, the UE 115-a may include at least one standalone frequency band combination and at least one ENDC frequency band combination, which may enable the UE 115-a to handover to that particular frequency band's cells. For example, all of the network requested frequency bands may include (257, 261, 1, 2, 3, 7, 77, 78, 79, 41, and 66). Possible NRCA frequency band combinations may include (n257AA+xx), (n261AA+xx), (n1AA+xx), (n2AA+xx), (n3AA+xx), (n7AA+xx), (n78AA+xx), (n79AA+xx), (n41AA+xx), and (n66AA+xx). The term "xx" indicates any other supported frequency band. These NRCA frequency band combinations may be indicated in the capability message because all of the network requested frequency bands are included and supports uplink. Likewise, ENDC frequency band combinations may include (b1x+n257AA+xx), (b1x+n261AA+xx), (b1x+n1AA+xx), (b1x+n2AA+xx), (b1x+n3AA+xx), (b1x+n7AA+xx), (b1x+n78AA+xx), (b1x+n79AA+xx), (b1x+n41AA+xx), and (b1x+n66AA+xx). If there is any additional space available for more indications of other frequency band combinations, the UE 115-a may include additional frequency band combination in the capability message.

At 225, the UE 115-a may generate the capability message and include all of the selected frequency band combinations. The UE 115-a may generate a single capability message. While sending more than one capability message in order to include more frequency band combinations may be possible, this requires the UE 115-a and the base station 105-a to support the use of multiple capability messages. Many UEs 115 and base stations 105 may not support using multiple capability messages. Furthermore, using multiple capability messages may increase processing power requirements and reduce network efficiency.

At 230, the UE 115-a may send the capability message to the base station 105-a. At 235, the base station 105-a and the UE 115-a may communicate using one of the frequency bands indicated in the capability message, as both the UE 115-a and the base station 105-a supports the frequency band.

Techniques described herein enable the UE 115-a to send frequency band combinations having uplink support for each network frequency band in a single capability message (e.g., a single UE Capability Information message). Sending a single capability message may provide for improved network efficiency and less processing power consumption. The UE 115-a may use the prioritization techniques to enhance UE coverage, reduce call dropping, and avoid some radio link failures.

Figure 3:
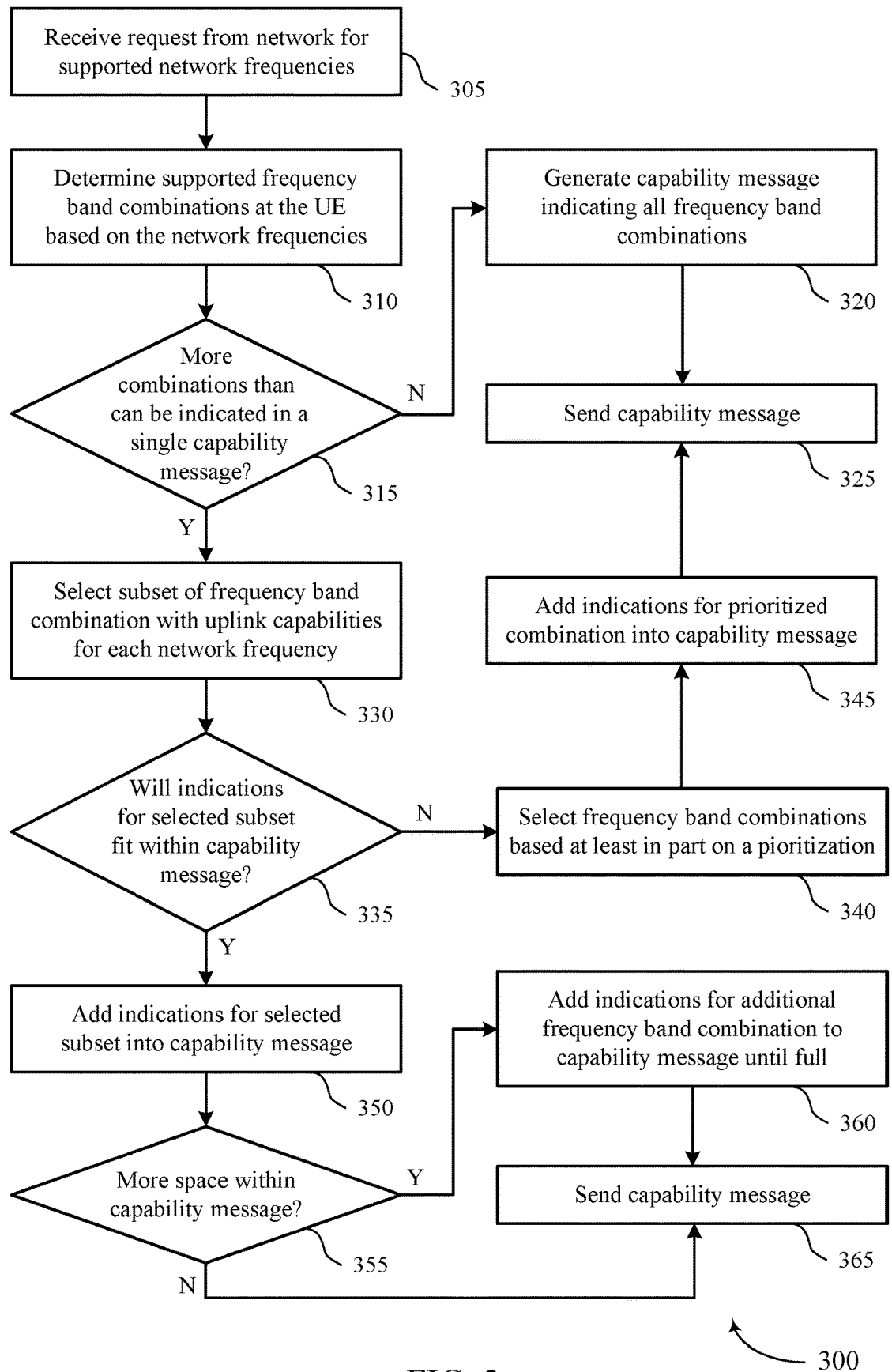
FIG. 3 illustrates a flowchart showing an example of a process flow that supports UE capability frequency band combination prioritization in accordance with aspects of the present disclosure.

FIG. 3 illustrates a flowchart 300 showing an example of a process flow that supports UE capability frequency band combination prioritization in accordance with aspects of the present disclosure. The flowchart 300 may support techniques for prioritizing which supported frequency band combinations to include in response to a capability enquiry request message. In some examples, the flowchart 300 may implement aspects of wireless communications system 100. In one example, the flowchart 300 may be implemented by a UE 115 as described with reference to FIGS. 1 and 2. For example, the flowchart 300 may illustrate receiving a capability request, selecting a subset of frequency band combinations supported by the UE, sending a capability message that includes indications for the selected subset, and communicating with the network over an indicated frequency band combination, as described with reference to FIGS. 1 and 2.

At 305, the UE may receive a request from a network for supported network frequencies. At 310, the UE may determine a set of frequency band combinations that are supported at the UE and correspond to the network requested frequency bands. At 315, the UE may determine whether there are more frequency band combinations than may be indicated in a capability message. If all of the frequency band combinations will fit within the capability message, then the UE may generate the capability message with all of the frequency band combinations at 320 and send the capability message to the network at 325.

However, if the numerical quantity of the set of multiple frequency band combinations supported by the UE exceeds the size constraint of the capability message, then indications of only some of the set of multiple frequency band combinations can fit within the capability message. If that is the case, then the set of frequency band combinations is larger than can be indicated in the capability message, at 315, the flowchart 300 proceeds to 330.

At 330, the UE may select a subset of frequency band combinations, wherein each network requested frequency band is represented, and all of the frequency band combinations have uplink support. At 335, the UE may determine whether all of the selected subset of frequency band combinations can be indicated in the capability message. If not, the flowchart 300 proceeds to 340 and the UE may select those of the subset to be indicated in the capability message based at least in part on a prioritization. The prioritization may be according to an order of the network frequency bands, proximity of cells having certain frequency bands, a history of the UE or network using certain frequency bands, a preference of the UE or network for certain frequency bands, a preference for a type of communication, or the like. The flowchart 300 proceeds to 345 and the UE may add the indications for the prioritized frequency band combinations into the capability message, and then send it at 325.

Returning to 335, the UE may determine that all of the selected subset of frequency band combinations can be indicated in the capability message and the flowchart proceeds to 350. At 350, the UE may add the indications for the prioritized frequency band combinations into the capability message. At 355, the UE may determine whether the capability message can include more indications for other frequency band combinations. If the capability message is full of indications for the subset of selected frequency band combinations, the UE may send the capability message at 365. However, if there happens to be more room for additional indications of frequency band combinations, the UE may add indications for additional frequency band combination to the capability message until it is full. The UE may then send the capability message at 365.

Figure 4:
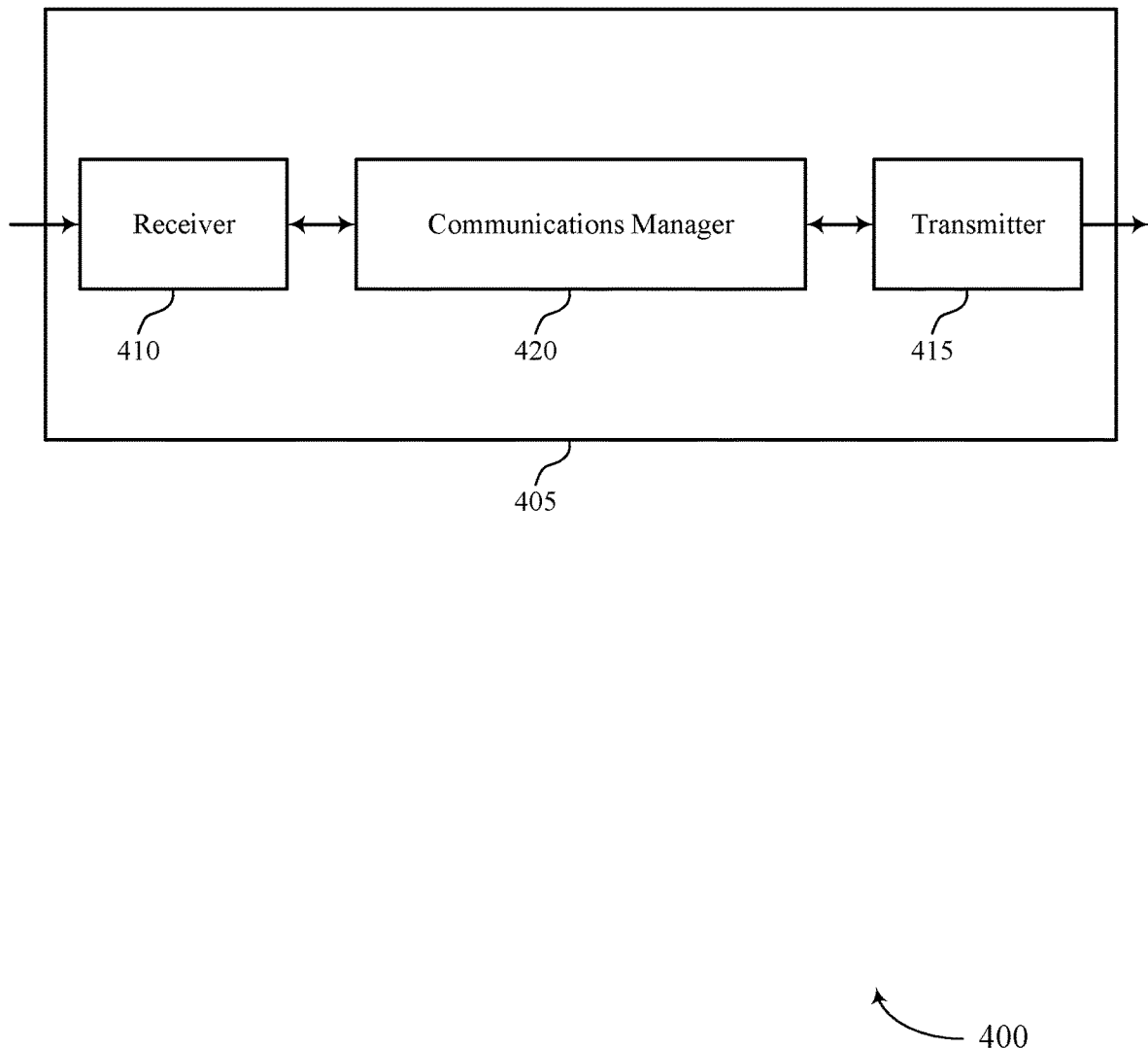
FIGS. 4 and 5 show block diagrams of devices that support UE capability frequency band combination prioritization in accordance with aspects of the present disclosure.

FIG. 4 shows a block diagram 400 of a device 405 that supports UE capability frequency band combination prioritization in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses). The communications manager 420 may be an example of aspects of a communications manager 160 as described herein.

The receiver 410 may provide a means for receiving information such as packets, user data, control information, or any combination thereof associated with various information channels (e.g., control channels, data channels, information channels related to UE capability frequency band combination prioritization).

Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to UE capability frequency band combination prioritization). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of UE capability frequency band combination prioritization as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving a request for a frequency band capability of the UE from a network, where the request includes a set of multiple network frequency bands. The communications manager 420 may be configured as or otherwise support a means for selecting a subset of frequency band combinations from a set of multiple frequency band combinations supported by the UE, where a numerical quantity of the set of multiple frequency band combinations supported by the UE exceeds a size constraint of a capability message, and where the subset of frequency band combinations includes at least one frequency band combination for each network frequency band of the set of multiple network frequency bands. The communications manager 420 may be configured as or otherwise support a means for sending the capability message in response to the request, the capability message including an indication of the subset of frequency band combinations. The communications manager 420 may be configured as or otherwise support a means for communicating with the network over a frequency band combination indicated in the capability message.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improving UE wireless coverage, reducing call dropping, improving handovers, and reducing RLF and connection-release events.

Figure 5:
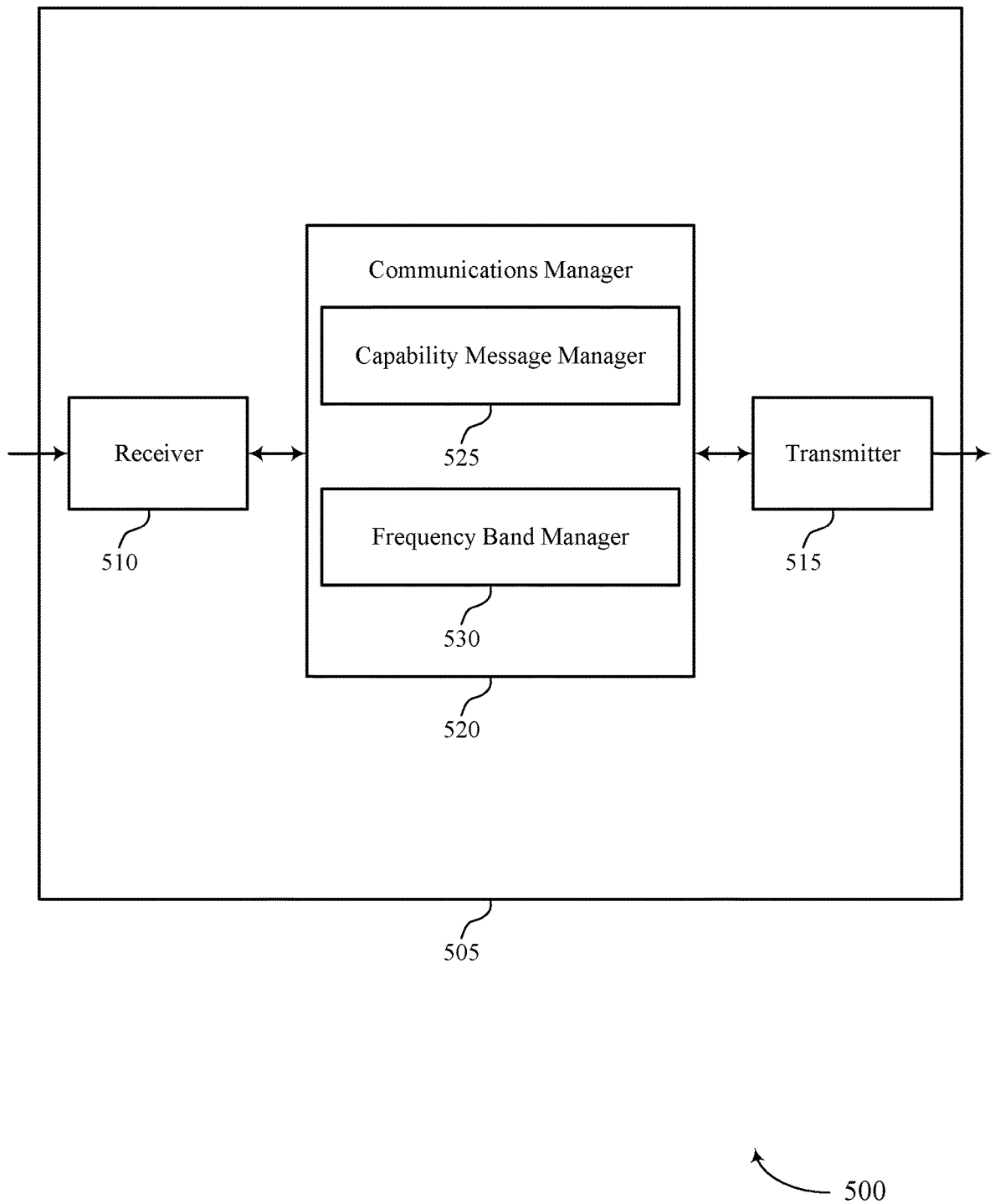

FIG. 5 shows a block diagram 500 of a device 505 that supports UE capability frequency band combination prioritization in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to UE capability frequency band combination prioritization). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to UE capability frequency band combination prioritization). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of UE capability frequency band combination prioritization as described herein. For example, the communications manager 520 may include a capability message manager 525, a frequency band manager 530, or any combination thereof. The communications manager 520 may be an example of aspects of a communications manager 420 and 160 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The capability message manager 525 may be configured as or otherwise support a means for receiving a request for a frequency band capability of the UE from a network, where the request includes a set of multiple network frequency bands. The frequency band manager 530 may be configured as or otherwise support a means for selecting a subset of frequency band combinations from a set of multiple frequency band combinations supported by the UE, where a numerical quantity of the set of multiple frequency band combinations supported by the UE exceeds a size constraint of a capability message, and where the subset of frequency band combinations includes at least one frequency band combination for each network frequency band of the set of multiple network frequency bands. The capability message manager 525 may be configured as or otherwise support a means for sending the capability message in response to the request, the capability message including an indication of the subset of frequency band combinations. The capability message manager 525 may be configured as or otherwise support a means for communicating with the network over a frequency band combination indicated in the capability message.

Figure 6:
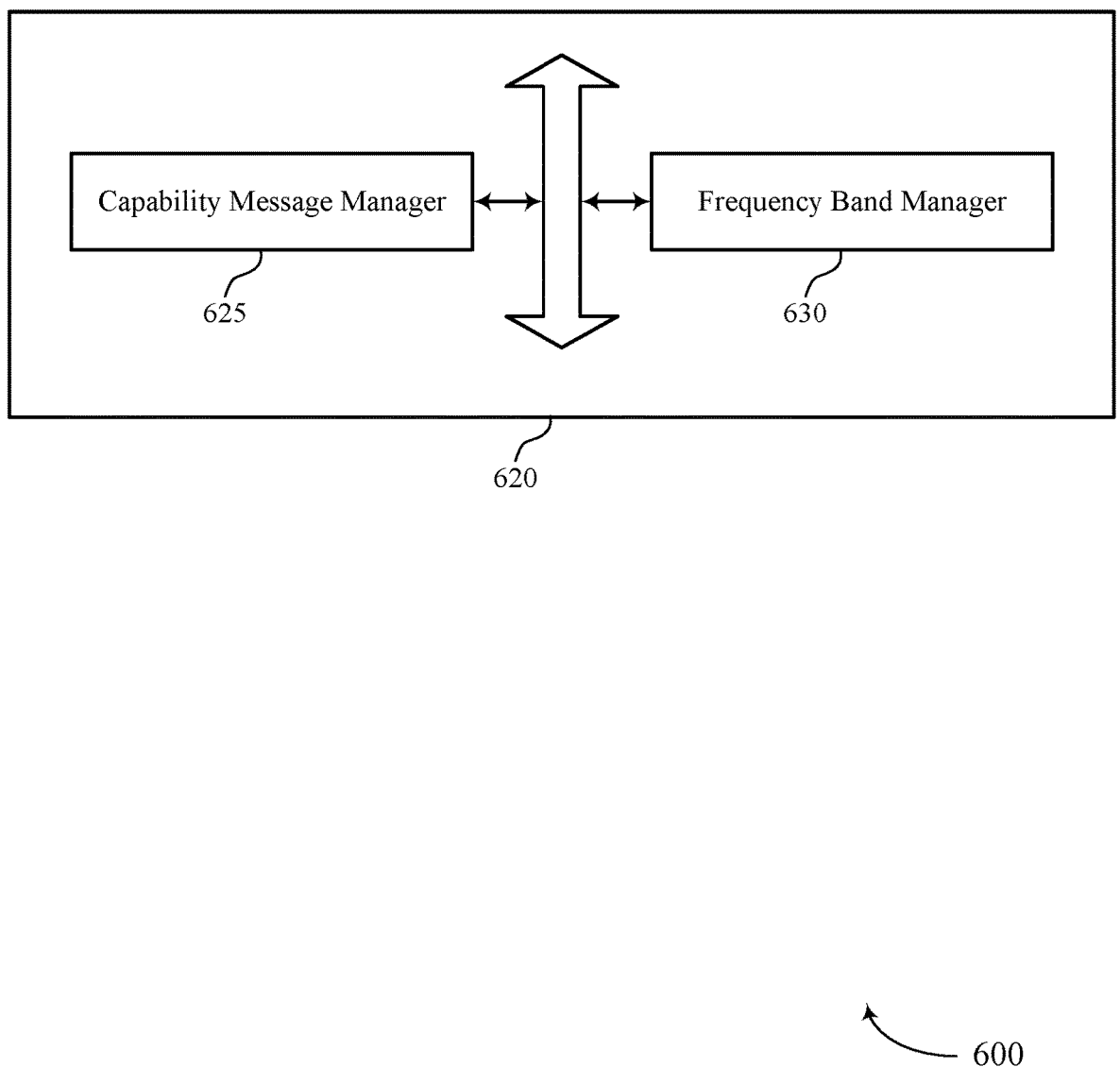
FIG. 6 shows a block diagram of a communications manager that supports UE capability frequency band combination prioritization in accordance with aspects of the present disclosure.

FIG. 6 shows a block diagram 600 of a communications manager 620 that supports UE capability frequency band combination prioritization in accordance with aspects of the present disclosure. The communications manager 620 may be an example of aspects of a communications manager 420, a communications manager 520, or both, as described herein. The communications manager 620, or various components thereof, may be an example of means for performing various aspects of UE capability frequency band combination prioritization as described herein. For example, the communications manager 620 may include a capability message manager 625, a frequency band manager 630, or any combination thereof. Each of these components may communicate, directly or indirectly, with one another (e.g., via one or more buses).

The communications manager 620 may support wireless communication at a UE in accordance with examples as disclosed herein. The capability message manager 625 may be configured as or otherwise support a means for receiving a request for a frequency band capability of the UE from a network, where the request includes a set of multiple network frequency bands. The frequency band manager 630 may be configured as or otherwise support a means for selecting a subset of frequency band combinations from a set of multiple frequency band combinations supported by the UE, where a numerical quantity of the set of multiple frequency band combinations supported by the UE exceeds a size constraint of a capability message, and where the subset of frequency band combinations includes at least one frequency band combination for each network frequency band of the set of multiple network frequency bands. In some examples, the capability message manager 625 may be configured as or otherwise support a means for sending the capability message in response to the request, the capability message including an indication of the subset of frequency band combinations. The capability message manager 625 may be configured as or otherwise support a means for communicating with the network over a frequency band combination indicated in the capability message.

In some examples, the numerical quantity of the set of multiple frequency band combinations supported by the UE exceeds the size constraint of the capability message when indications of only some of the set of multiple frequency band combinations can fit within the capability message. The numerical quantity of the set of multiple frequency band combinations may refer to the number of frequency band combinations that may be indicated within the capability message.

In some examples, the capability message manager 625 may be configured as or otherwise support a means for selecting additional frequency band combinations for inclusion in the capability message from the set of multiple frequency band combinations after including the subset of frequency band combinations to fill a maximum size of the capability message. In some examples, the capability message includes a single reporting element with a maximum size that is smaller than a size for reporting all of the set of multiple frequency band combinations supported by the UE.

In some examples, selecting the subset of frequency band combinations from the set of multiple frequency band combinations supported by the UE is based on an order of the set of multiple network frequency bands in the request. In other examples, selecting the subset of frequency band combinations from the set of multiple frequency band combinations supported by the UE is based on a number of component carriers of the frequency band combination. In some examples, each frequency band of the subset of frequency bands supports uplink capabilities at the UE.

In some examples, the at least one frequency band combination includes at least one ENDC frequency band combination and at least one standalone frequency band combination. In some examples, the set of multiple network frequency bands include frequency bands from at least two different radio access technologies.

Figure 7:
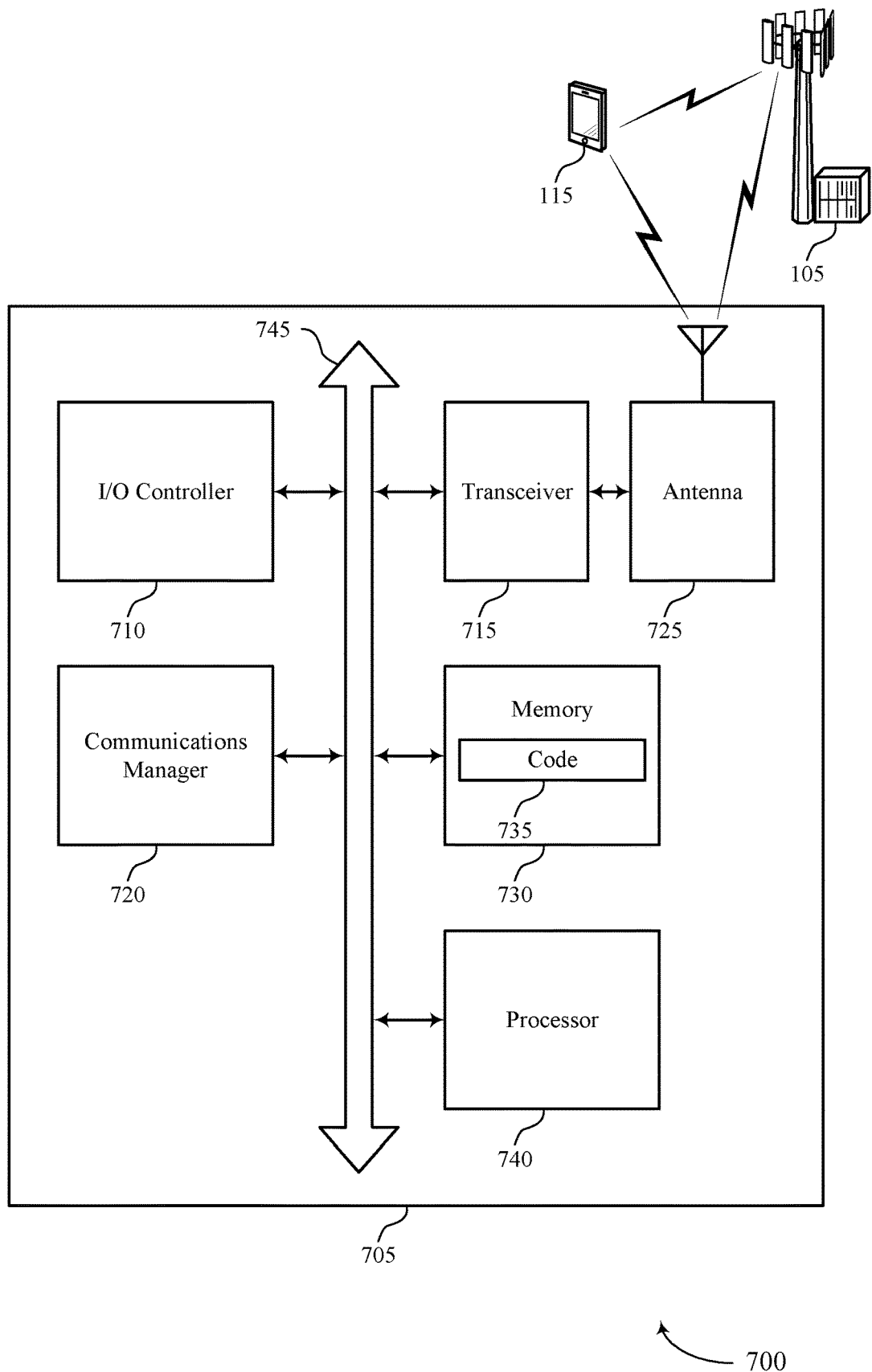
FIG. 7 shows a diagram of a system including a device that supports UE capability frequency band combination prioritization in accordance with aspects of the present disclosure.

FIG. 7 shows a diagram of a system 700 including a device 705 that supports UE capability frequency band combination prioritization in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting UE capability frequency band combination prioritization). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving a request for a frequency band capability of the UE from a network, where the request includes a set of multiple network frequency bands. The communications manager 720 may be configured as or otherwise support a means for selecting a subset of frequency band combinations from a set of multiple frequency band combinations supported by the UE, where a numerical quantity of the set of multiple frequency band combinations supported by the UE exceeds a size constraint of a capability message, and where the subset of frequency band combinations includes at least one frequency band combination for each network frequency band of the set of multiple network frequency bands. The communications manager 720 may be configured as or otherwise support a means for sending the capability message in response to the request, the capability message including an indication of the subset of frequency band combinations. The communications manager 720 may be configured as or otherwise support a means for communicating with the network over a frequency band combination indicated in the capability message.

By including or configuring the communications manager 720 in accordance with examples as described herein, the device 705 may support techniques for improved UE coverage, improved communication reliability, improved handovers, reduced call dropping, reduced latency, improved user experience related to reduced processing, and reduced power consumption.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of UE capability frequency band combination prioritization as described herein, or the processor 740 and the memory 730 may be otherwise configured to perform or support such operations.

Figure 8:
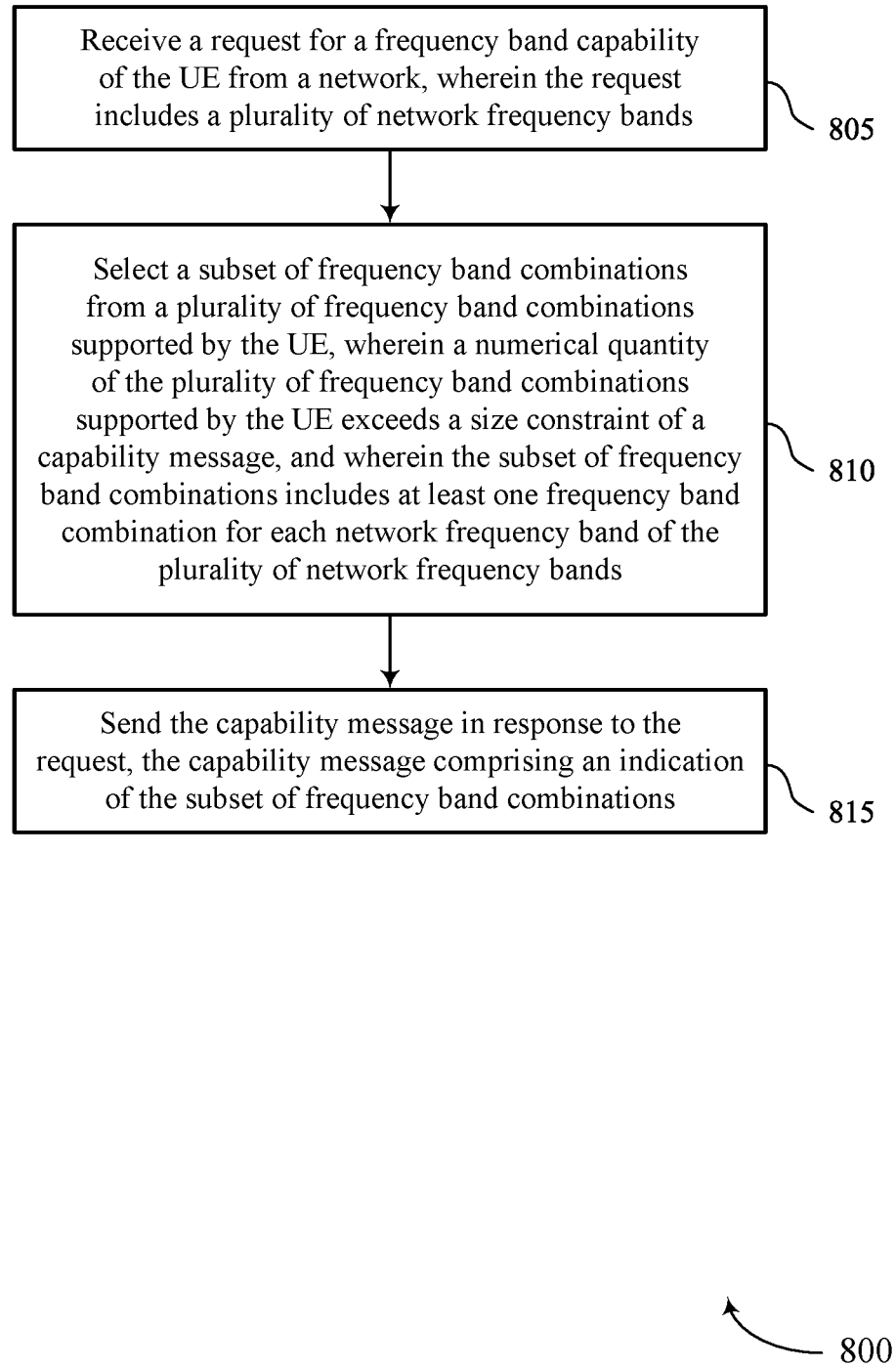
FIGS. 8 and 9 show flowcharts illustrating methods that support UE capability frequency band combination prioritization in accordance with aspects of the present disclosure.

FIG. 8 shows a flowchart illustrating a method 800 that supports UE capability frequency band combination prioritization in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include receiving a request for a frequency band capability of the UE from a network, where the request includes a set of multiple network frequency bands. The operations of 805 may be performed in accordance with examples as disclosed herein. In some examples, aspects of the operations of 805 may be performed by a capability message manager 625 as described with reference to FIG. 6.

At 810, the method may include selecting a subset of frequency band combinations from a set of multiple frequency band combinations supported by the UE, where a numerical quantity of the set of multiple frequency band combinations supported by the UE exceeds a size constraint of a capability message, and where the subset of frequency band combinations includes at least one frequency band combination for each network frequency band of the set of multiple network frequency bands. The operations of 810 may be performed in accordance with examples as disclosed herein. In some examples, aspects of the operations of 810 may be performed by a frequency band manager 630 as described with reference to FIG. 6.

At 815, the method may include sending the capability message in response to the request, the capability message including an indication of the subset of frequency band combinations. The operations of 815 may be performed in accordance with examples as disclosed herein. In some examples, aspects of the operations of 815 may be performed by a capability message manager 625 as described with reference to FIG. 6.

Figure 9:
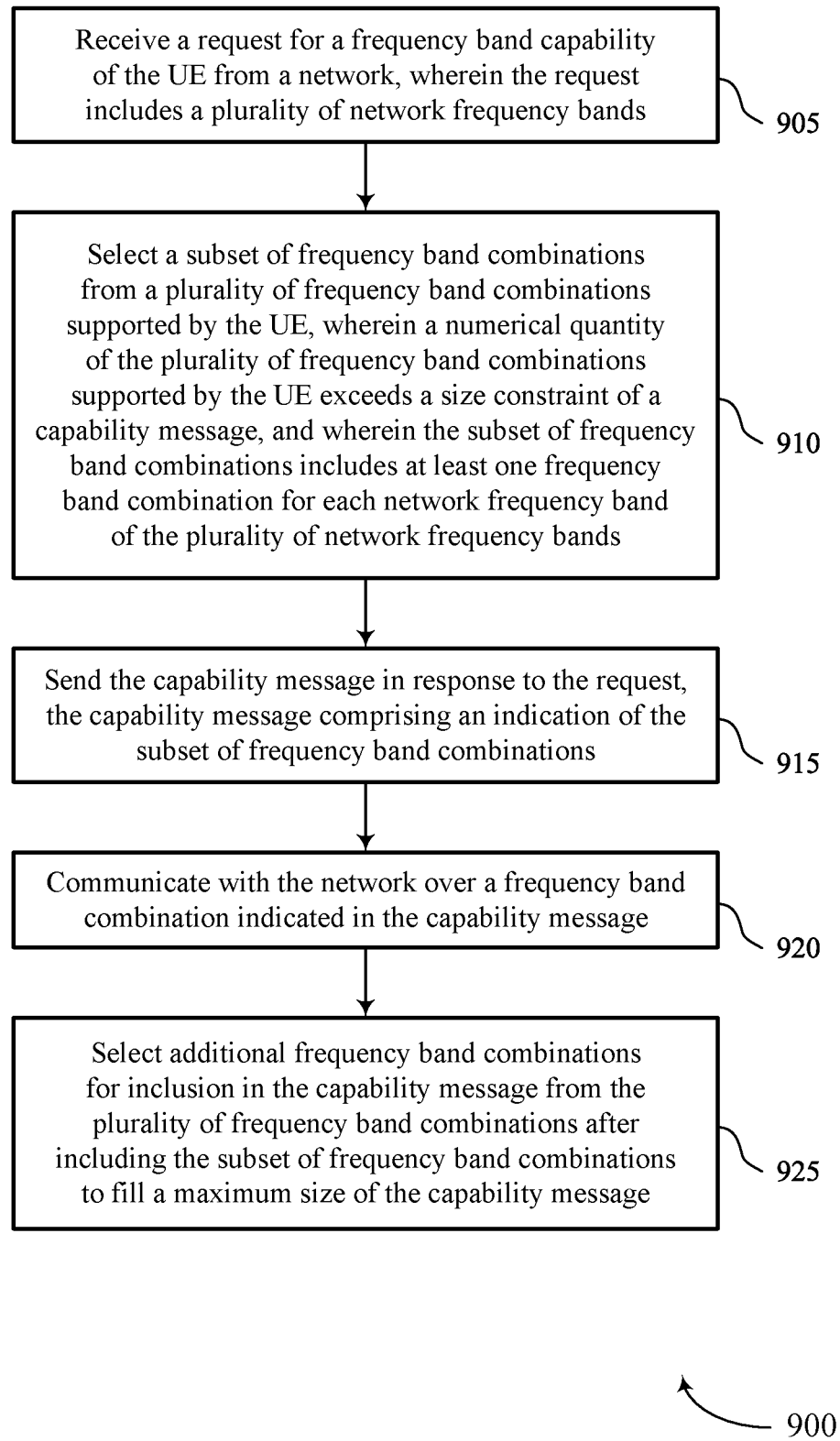

FIG. 9 shows a flowchart illustrating a method 900 that supports UE capability frequency band combination prioritization in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include receiving a request for a frequency band capability of the UE 115 from a network, where the request includes a set of multiple network frequency bands. The operations of 905 may be performed in accordance with examples as disclosed herein. In some examples, aspects of the operations of 905 may be performed by a capability message manager 625 as described with reference to FIG. 6.

At 910, the method may include selecting a subset of frequency band combinations from a set of multiple frequency band combinations supported by the UE, where a numerical quantity of the set of multiple frequency band combinations supported by the UE exceeds a size constraint of a capability message, and where the subset of frequency band combinations includes at least one frequency band combination for each network frequency band of the set of multiple network frequency bands. The operations of 910 may be performed in accordance with examples as disclosed herein. In some examples, aspects of the operations of 910 may be performed by a frequency band manager 630 as described with reference to FIG. 6.

At 915, the method may include sending the capability message in response to the request, the capability message including an indication of the subset of frequency band combinations. The operations of 915 may be performed in accordance with examples as disclosed herein. In some examples, aspects of the operations of 915 may be performed by a capability message manager 625 as described with reference to FIG. 6.

At 920, the method may include communicating with the network over a frequency band combination indicated in the capability message. The operations of 920 may be performed in accordance with examples as disclosed herein. In some examples, aspects of the operations of 920 may be performed by a capability message manager 625 as described with reference to FIG. 6.

At 925, the method may include selecting additional frequency band combinations for inclusion in the capability message from the set of multiple frequency band combinations after including the subset of frequency band combinations to fill a maximum size of the capability message. The operations of 925 may be performed in accordance with examples as disclosed herein. In some examples, aspects of the operations of 925 may be performed by a capability message manager 625 as described with reference to FIG. 6.

The following provides an overview of aspects of the present disclosure:

Aspect 1: A method for wireless communication at a UE, comprising: receiving a request for a frequency band capability of the UE from a network, wherein the request includes a plurality of network frequency bands; selecting a subset of frequency band combinations from a plurality of frequency band combinations supported by the UE, wherein a numerical quantity of the plurality of frequency band combinations supported by the UE exceeds a size constraint of a capability message, and wherein the subset of frequency band combinations includes at least one frequency band combination for each network frequency band of the plurality of network frequency bands; and sending the capability message in response to the request, the capability message comprising an indication of the subset of frequency band combinations.

Aspect 2: The method of aspect 1, wherein the numerical quantity of the plurality of frequency band combinations supported by the UE exceeds the size constraint of the capability message when indications of only some of the plurality of frequency band combinations can fit within the capability message.

Aspect 3: The method of aspect 2, further comprising: selecting additional frequency band combinations for inclusion in the capability message from the plurality of frequency band combinations after including the subset of frequency band combinations to fill a maximum size of the capability message.

Aspect 4: The method of any of aspects 2 through 3, wherein selecting the subset of frequency band combinations from the plurality of frequency band combinations supported by the UE is based at least in part on an order of the plurality of network frequency bands in the request Aspect 5: The method of any of aspects 2 through 4, wherein selecting the subset of frequency band combinations from the plurality of frequency band combinations supported by the UE is based at least in part on a number of component carriers of the frequency band combination Aspect 6: The method of any of aspects 1 through 5, wherein the each frequency band of the subset of frequency bands supports uplink capabilities at the UE.

Aspect 7: The method of any of aspects 1 through 6, wherein the capability message comprises a single reporting element with a maximum size that is smaller than a size for reporting all of the plurality of frequency band combinations supported by the UE.

Aspect 8: The method of any of aspects 1 through 7, wherein the at least one frequency band combination comprises at least one evolved universal terrestrial radio access ENDC frequency band combination and at least one stand-alone frequency band combination.

Aspect 9: The method of any of aspects 1 through 8, wherein the plurality of network frequency bands include frequency bands from at least two different radio access technologies.

Aspect 10: The method of any of aspects 1 through 9, further comprising: communicating with the network over a frequency band combination indicated in the capability message.

Aspect 11: An apparatus for wireless communication at a UE, comprising a processor; memory coupled with the processor; and instructions stored in the memory and executable by the processor to cause the apparatus to perform a method of any of aspects 1 through 10.

Aspect 12: An apparatus for wireless communication at a UE, comprising at least one means for performing a method of any of aspects 1 through 10.

Aspect 13: A non-transitory computer-readable medium storing code for wireless communication at a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   at least one processor; and
   at least one memory coupled with the at least one processor, with instructions stored in the at least one memory, the instructions being executable by the at least one processor, individually or in any combination, to cause the apparatus to:
   receive a request for a frequency band capability of the UE from a network, wherein the request includes a plurality of network frequency bands;
   select a first subset of frequency band combinations from a plurality of frequency band combinations supported by the UE, wherein a numerical quantity of the plurality of frequency band combinations supported by the UE exceeds a size constraint of a capability message, wherein the first subset of frequency band combinations includes at least one frequency band combination for each network frequency band of the plurality of network frequency bands, and wherein indications of only some of the plurality of frequency band combinations can fit within the capability message;
   select a second subset of frequency band combinations from the plurality of frequency band combinations for inclusion in the capability message, wherein indications of the second subset of frequency band combinations and indications of the first subset of frequency band combinations fill a maximum size of the capability message; and
   send the capability message in response to the request, the capability message comprising an indication of the first and second subsets of frequency band combinations.

2. The apparatus of claim 1, wherein selecting the first subset of frequency band combinations from the plurality of frequency band combinations supported by the UE is based at least in part on an order of the plurality of network frequency bands in the request.

3. The apparatus of claim 1, wherein selecting the first subset of frequency band combinations from the plurality of frequency band combinations supported by the UE is based at least in part on a number of component carriers of each frequency band combination of the plurality of frequency band combinations.

4. The apparatus of claim 1, wherein each frequency band of the first subset of frequency band combinations supports uplink capabilities at the UE.

5. The apparatus of claim 1, wherein the capability message comprises a single reporting element with a maximum size that is smaller than a size for reporting all of the plurality of frequency band combinations supported by the UE.

6. The apparatus of claim 1, wherein the at least one frequency band combination comprises at least one evolved universal terrestrial radio access (EUTRA)-new radio (NR) dual connectivity (ENDC) frequency band combination and at least one standalone frequency band combination.

7. The apparatus of claim 1, wherein the plurality of network frequency bands includes frequency bands from at least two different radio access technologies.

8. The apparatus of claim 1, wherein the instructions are further executable by the at least one processor to cause the apparatus to:
   communicate with the network over a frequency band combination indicated in the capability message.

9. A method for wireless communication at a user equipment (UE), comprising:
   receiving a request for a frequency band capability of the UE from a network, wherein the request includes a plurality of network frequency bands;
   selecting a first subset of frequency band combinations from a plurality of frequency band combinations supported by the UE, wherein a numerical quantity of the plurality of frequency band combinations supported by the UE exceeds a size constraint of a capability message, wherein the first subset of frequency band combinations includes at least one frequency band combination for each network frequency band of the plurality of network frequency bands, and wherein indications of only some of the plurality of frequency band combinations can fit within the capability message;

selecting a second subset of frequency band combinations from the plurality of frequency band combinations for inclusion in the capability message, wherein indications of the second subset of frequency band combinations and indications of first subset of frequency band combinations fill a maximum size of the capability message; and sending the capability message in response to the request, the capability message comprising an indication of the first and second subsets of frequency band combinations.

10. The method of claim 9, wherein selecting the first subset of frequency band combinations from the plurality of frequency band combinations supported by the UE is based at least in part on an order of the plurality of network frequency bands in the request.

11. The method of claim 9, wherein selecting the first subset of frequency band combinations from the plurality of frequency band combinations supported by the UE is based at least in part on a number of component carriers of each frequency band combination of the plurality of frequency band combinations.

12. The method of claim 9, wherein each frequency band of the first subset of frequency band combinations supports uplink capabilities at the UE.

13. The method of claim 9, wherein the capability message comprises a single reporting element with a maximum size that is smaller than a size for reporting all of the plurality of frequency band combinations supported by the UE.

14. The method of claim 9, wherein the at least one frequency band combination comprises at least one evolved universal terrestrial radio access (EUTRA)-new radio (NR) dual connectivity (ENDC) frequency band combination and at least one standalone frequency band combination.

15. The method of claim 9, wherein the plurality of network frequency bands includes frequency bands from at least two different radio access technologies.

16. The method of claim 9, further comprising:
communicating with the network over a frequency band combination indicated in the capability message.

17. An apparatus for wireless communication at a user equipment (UE), comprising:
means for receiving a request for a frequency band capability of the UE from a network, wherein the request includes a plurality of network frequency bands;
means for selecting a first subset of frequency band combinations from a plurality of frequency band combinations supported by the UE, wherein a numerical quantity of the plurality of frequency band combinations supported by the UE exceeds a size constraint of a capability message, wherein the first subset of frequency band combinations includes at least one frequency band combination for each network frequency band of the plurality of network frequency bands, and wherein indications of only some of the plurality of frequency band combinations can fit within the capability message;
means for selecting a second subset of frequency band combinations from the plurality of frequency band combinations for inclusion in the capability message, wherein indications of the second subset of frequency band combinations and indications of first subset of frequency band combinations fill a maximum size of the capability message; and
means for sending the capability message in response to the request, the capability message comprising an indication of the first and second subsets of frequency band combinations.

18. The apparatus of claim 17, wherein selecting the first subset of frequency band combinations from the plurality of frequency band combinations supported by the UE is based at least in part on an order of the plurality of network frequency bands in the request.

19. The apparatus of claim 17, wherein selecting the first subset of frequency band combinations from the plurality of frequency band combinations supported by the UE is based at least in part on a number of component carriers of each frequency band combination of the plurality of frequency band combinations.

20. The apparatus of claim 17, wherein each frequency band of the first subset of frequency band combinations supports uplink capabilities at the UE.

21. The apparatus of claim 17, wherein the capability message comprises a single reporting element with a maximum size that is smaller than a size for reporting all of the plurality of frequency band combinations supported by the UE.

22. The apparatus of claim 17, wherein the at least one frequency band combination comprises at least one evolved universal terrestrial radio access (EUTRA)-new radio (NR) dual connectivity (ENDC) frequency band combination and at least one standalone frequency band combination.

23. The apparatus of claim 17, wherein the plurality of network frequency bands includes frequency bands from at least two different radio access technologies.

24. The apparatus of claim 17, further comprising:
means for communicating with the network over a frequency band combination indicated in the capability message.

* * * * *